US007194280B2

(12) United States Patent
Vanghi (10) Patent No.: US 7,194,280 B2
(45) Date of Patent: *Mar. 20, 2007

(54) MOBILE STATION ASSISTED FORWARD LINK OPEN LOOP POWER AND RATE CONTROL IN A CDMA SYSTEM

(75) Inventor: Vieri Vanghi, San Diego, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 671 days.

This patent is subject to a terminal disclaimer.

(21) Appl. No.: 10/145,858

(22) Filed: May 14, 2002

(65) Prior Publication Data

US 2002/0155854 A1  Oct. 24, 2002

Related U.S. Application Data

(63) Continuation-in-part of application No. 09/481,948, filed on Jan. 12, 2000, now Pat. No. 6,393,276.

(51) Int. Cl.
  *H04B 7/00* (2006.01)
(52) U.S. Cl. ............. 455/522; 455/442; 455/67.11; 455/115.3; 455/226.2
(58) Field of Classification Search ............ 455/436, 455/437, 438, 67.11, 67.13, 115.1, 115.3, 455/226.1, 226.2, 226.3, 522; 370/328, 331–335
See application file for complete search history.

(56) References Cited

U.S. PATENT DOCUMENTS

| 6,060,999 | A | * | 5/2000 | Abe et al. .................... 340/7.6 |
| 6,069,883 | A | * | 5/2000 | Ejzak et al. ................. 370/335 |
| 6,088,335 | A | * | 7/2000 | I et al. ......................... 370/252 |
| 6,337,984 | B1 | * | 1/2002 | Hong et al. ................. 455/439 |
| 6,393,276 | B1 | * | 5/2002 | Vanghi .................... 455/422.1 |
| 6,453,151 | B1 | * | 9/2002 | Kiang et al. ............. 455/67.11 |
| 6,501,958 | B1 | * | 12/2002 | Hwang et al. ............. 455/522 |
| 6,963,750 | B1 | * | 11/2005 | Cheng et al. ............... 455/458 |
| 2002/0187801 | A1 | * | 12/2002 | Vanghi ....................... 455/522 |

* cited by examiner

*Primary Examiner*—Temica Beamer
(74) *Attorney, Agent, or Firm*—Coats & Bennett, P.L.L.C.

(57) ABSTRACT

Establishment of a forward link traffic channel between one or more candidate base stations and a mobile station considers forward link quality such that the initial transmit power is set to a level that achieves a desired received signal quality at the mobile station. With this approach, the initial transmit power is set to a mobile-specific power level rather than to a default initial transmit power level. That is, the open loop transmit power control that sets traffic channel power at the outset of a call, or under certain handoff scenarios, uses knowledge of forward link channel loss and interference to set initial transmit power for the traffic channel to the level needed to achieve the target signal quality at the mobile station. Such knowledge is gained from receiving pilot signal measurements for the candidate base stations from the mobile station, which measurements may be improved in accuracy by compensating them for base station loading.

37 Claims, 4 Drawing Sheets

MOBILE STATION ASSISTED FORWARD LINK OPEN LOOP POWER AND RATE CONTROL IN A CDMA SYSTEM

RELATED APPLICATIONS

This application is a continuation-in-part of the application Ser. No. 09/481,948, now U.S. Pat. No. 6,393,276 entitled "Mobile Station Assisted Forward Link Open Loop Power And Rate Control In A CDMA System," and filed on Jan. 12, 2000, which is incorporated in its entirety herein by reference.

BACKGROUND OF THE INVENTION

The present invention generally relates to wireless communication systems, and particularly relates to determination of the initial transmit power required to reliably establish a forward link traffic channel between a network and a mobile station.

Transmit power control is an essential element of many wireless communication systems, and is particularly needed in Code Division Multiple Access (CDMA) systems, where potentially large numbers of users share a common frequency or frequencies and rely on unique spreading codes to differentiate between users' signals. Such systems employ relatively sophisticated power control mechanisms for both forward link and reverse link transmissions.

In the typical CDMA system, forward and reverse link power control rely on closed-loop transmit power control during active communication between the network and a given mobile station. For example, during an active call, the network controls forward link traffic channel transmit power based on power control commands returned from the associated mobile station. If received signal quality at the mobile station falls below a desired threshold, it commands the network to increase transmit power; otherwise it commands the network to decrease transmit power. Thus, forward link transmit power is generally maintained at the minimum level required to maintain acceptable received signal quality at the mobile station. Reverse link power control employs similar closed-loop techniques, but with the network providing power control commands to the mobile stations, such that supporting base stations receive transmissions from the mobile stations at minimum required levels.

While the above power control schemes offer advantageous operation during active calls, they generally require the existence of a traffic channel or other data channel on the forward and reverse links. That is, these closed-loop power control schemes represent an approach to maintaining transmit powers in support of a communication over one or more traffic channels, but they do not, for example, provide a mechanism for establishing or determining an initial transmit power level.

Initialization of forward link traffic channel power arises in several scenarios including, but not limited to, call origination, soft/softer handoff, and hard handoff. Reliable establishment of forward link traffic channels aids network efficiency by reducing the signaling overhead arising from repeated connection attempts, and measurably influences users' perceptions of service quality. Thus, a conventional approach to setting initial traffic channel transmit power embraces a "more is better" philosophy, and simply sets the initial transmit power at a level high enough to ensure reliable mobile station reception under many circumstances. Of course, once the forward link traffic channel is established, power control feedback from the mobile station generally reduces transmit power to the minimum level required. Still, using a high default initial transmit power means that statistically the initial transmit power is set higher than actually needed by the typical mobile station. As such, opportunities exist for improving overall network efficiency and capacity based on a more intelligent approach to power initialization.

BRIEF SUMMARY OF THE INVENTION

The present invention relates to a method and apparatus enabling a wireless communication network to set the initial transmit power of a forward link traffic channel based on a determination of the power required to achieve a target received signal quality for the traffic channel at a target mobile station. Determination of the required transmit power considers forward link quality as inferred from signal measurements made by the mobile station. In an exemplary embodiment, the mobile station feeds back measurement information for pilot channel signals from one or more base stations that are candidates for serving the mobile station on the forward link traffic channel to be established, i.e., base stations in the mobile station's "active set."

Generally, the target received signal quality for the traffic channel is pre-determined based on the service option negotiated between the mobile station and the network. That is, the received signal quality to achieve a given frame error rate (FER), or to maintain some other reception quality metric at the mobile station, is known to the network a priori based on the target data rate selected for serving the mobile station on the forward link traffic channel. Note that the network might adjust the target received signal quality based on the number of serving base stations to reflect the possible benefits of transmit diversity. The mobile station may also autonomously update the target signal quality, based, for example, on the rate of frames received in error, within a range established by the network.

Determination of the required initial transmit power reflects the desire to calculate a mobile-specific transmit power value that achieves the target received signal quality for the traffic channel but does not transmit excessive power which otherwise reduces system capacity. To do so, the network bases its transmit power calculation on the pilot signal measurements made by the mobile station. These measurements reflect the attenuation (path loss) and interference experienced by the mobile station, and thus may be used to determine the actual traffic channel transmit power required of each serving base station such that the mobile station receives the traffic channel at the target received signal quality.

However, the pilot signal measurements made by the mobile station may be biased by base station loading. Interference at the mobile station comprises in-cell interference, out-of-cell interference, and general interference arising from innumerable other sources. Here, the extent of in-cell interference depends on base station loading and the non-orthogonality of the spreading codes used for the in-cell transmissions from the cell's serving base station or sector. Nominally, the cross-correlation between the unique spreading codes is zero such that the mobile station can despread its intended signal with essentially no interference from coded signals intended for other mobiles in the cell. However, such zero cross-correlation depends on spreading code time alignment, which is compromised by multipath propagation of transmitted signals within the cell.

Thus, calculation of the initial transmit power preferably uses compensated pilot signal measurements from which base station loading bias is removed, and further uses estimated or default forward link multipath characteristics such that the effects of multipath propagation are considered in the calculation. In an exemplary embodiment, the result of these considerations is a transmit power calculation that determines transmit power on a per connection basis. That is, the power calculation represents a joint calculation that determines the required power from each of the base stations that will be used to support the forward link traffic channel. While exemplary embodiments calculate per connection transmit power on a balanced basis, that is, with the total required transmit power equally divided between the connections, the power calculation may be modified for unequal per connection power if so desired.

Where each candidate base station provides at most one traffic channel connection per forward link traffic channel, the maximum number of such connections available for the traffic channel to be established is limited to the size of the mobile station's candidate set. The candidate set comprises of those pilots that are received with sufficient strength and deemed suitable for inclusion in the active set, which is the set of pilots corresponding to dedicated traffic channel connection. The mobile station informs the network of the pilots included in the candidate set by means of a signaling message sent on a control channel at call setup, that is, before the traffic channel is established. Generally, the network uses all of the candidate base stations to establish the traffic channel. That is, a traffic channel connection is established at each candidate base station. However, dynamic conditions such as base station loading and resource availability may cause the network to use less than all active set base stations.

For example, where the transmit power computed exceeds the power available for forward link allocation at one or more of the candidate base stations intended to provide a traffic channel connection, the network generally adopts one of two approaches. First, the network may reduce the traffic channel data rate, which has the effect of reducing the required received signal quality target and thereby reduces the required transmit power. The network then performs the initial transmit power calculation again based on the lowered received signal quality target to determine whether the updated per connection transmit power is available for each planned connection. If not, the network may lower the data rate and repeat the process in iterative fashion.

Second, the network may elect not to use a candidate base station that lacks sufficient reserve power. The network may make this election initially or as part of the above iterative approach, such as when the minimum permitted data rate is reached. With this second approach, the network simply does not use planned connections from the base station or stations that lack sufficient forward link power. Thus, this approach requires the network to re-calculate the required initial transmit power based on a per connection basis using the newly reduced number of connections. Note that the per connection transmit power versus the total required transmit power does not necessarily enjoy a linear relationship because, for example, the planned connection that is dropped from consideration may be associated with the most favorable forward link path relative to the mobile. Thus, omitting that connection from consideration may result in a disproportionate increase in the required total transmit power.

Typically, once the network establishes the forward link traffic channel with the mobile station, the network employs closed-loop power control based on power-control commands received from the mobile station to maintain the required forward link traffic channel power. However, the above techniques for setting the initial transmit power for the forward link traffic channel are applicable to a variety of call scenarios including, but not limited to, call origination, soft and softer handoff, and even hard handoff. More generally, those skilled in the art will recognize that the above techniques are applicable any time forward link traffic channel transmit power must be set in open-loop fashion.

DETAILED DESCRIPTION OF THE INVENTION

Figure 1:
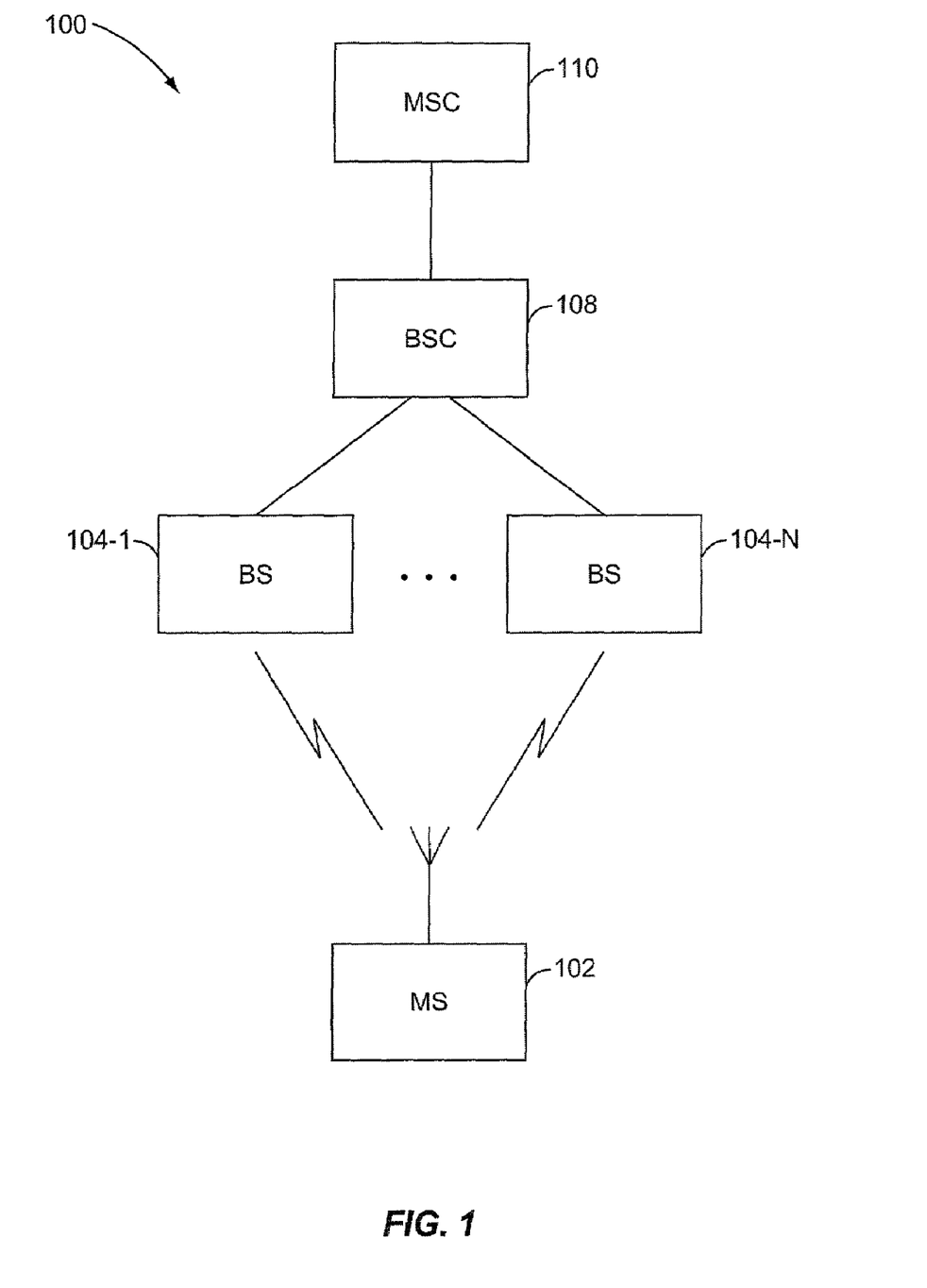
FIG. 1 is a diagram of an exemplary wireless communication network for practicing the present invention.

FIG. 1 illustrates a wireless communication network 100 supporting wireless communication with a mobile station (MS) 102. Network 100 comprises a plurality of base stations (BSs) 104, a base station controller (BSC) 108, and a mobile switching center (MSC) 110. It should be understood that the illustration represents a simplification of actual network implementations, and that network 100 might in actuality comprise other network entities such as home location registers (HLRs), access/authentication/authorization (AAA) systems, as well as including additional MSCs 110, BSCs 108, and BSs 104. Further, those skilled in the art will recognize that nomenclature and implementation details may differ between network standards, such as between CDMA systems based on IS-95/2000 and those based on, for example, Wideband CDMA (WCDMA). Thus, it should be understood that network 100 represents an exemplary framework for explaining the present invention, and that the present invention may be practiced across a variety of network types.

Each BSC 108 controls number of BSs 104, i.e., BSs 104-1, 104-2 . . . 104-N. Each of the BSs 104 includes radio resources for transmitting to and receiving from pluralities of MSs 102. BSs 104 transmit to MSs 102 on forward links and receive from the MSs 102 on reverse links. In CDMA systems such as IS-95/2000, multiple BSs 104 may be used to simultaneously support communication between the network 100 and a given MS 102. That is, the network may transmit forward link traffic to the MS 102 from more than one BS 104 and receive reverse link traffic from the MS 102 at more than one BS 104.

The set of BSs 104 available at any given time for forward link traffic transmissions to the MS 102 is referred to as the mobile's "active set." Typically, the MS 102 measures the strength of the pilot signal from nearby BSs 104 and sets its active set based on which pilot signals are received above a given signal threshold. Thus, BSs 104 in the mobile's pilot set may be referred to as "candidate" base stations because each one is a candidate for serving the MS 102, based on the mobile's ability to receive signals from them at relatively good signal levels.

In accordance with one or more exemplary embodiments of the present invention, the initial transmit power selected for a traffic channel to be established between one or more candidate BSs 104 and the MS 102 is set based on pilot signal measurements made by the MS 102. Essentially, this initialization approach uses pilot signal measurements returned by the MS 102 to determine what level of transmit power is needed to overcome current path loss and interference conditions as is inferentially determinable from the pilot signal measurements. That is, the network 100 infers expected transmit signal degradation from the path loss and interference conditions indicated by the pilot signal measurements returned to the network by the MS 102, and sets the initial forward link traffic channel transmit power to the level required such that the MS 102 receives the traffic channel with a required signal quality.

Figure 2:
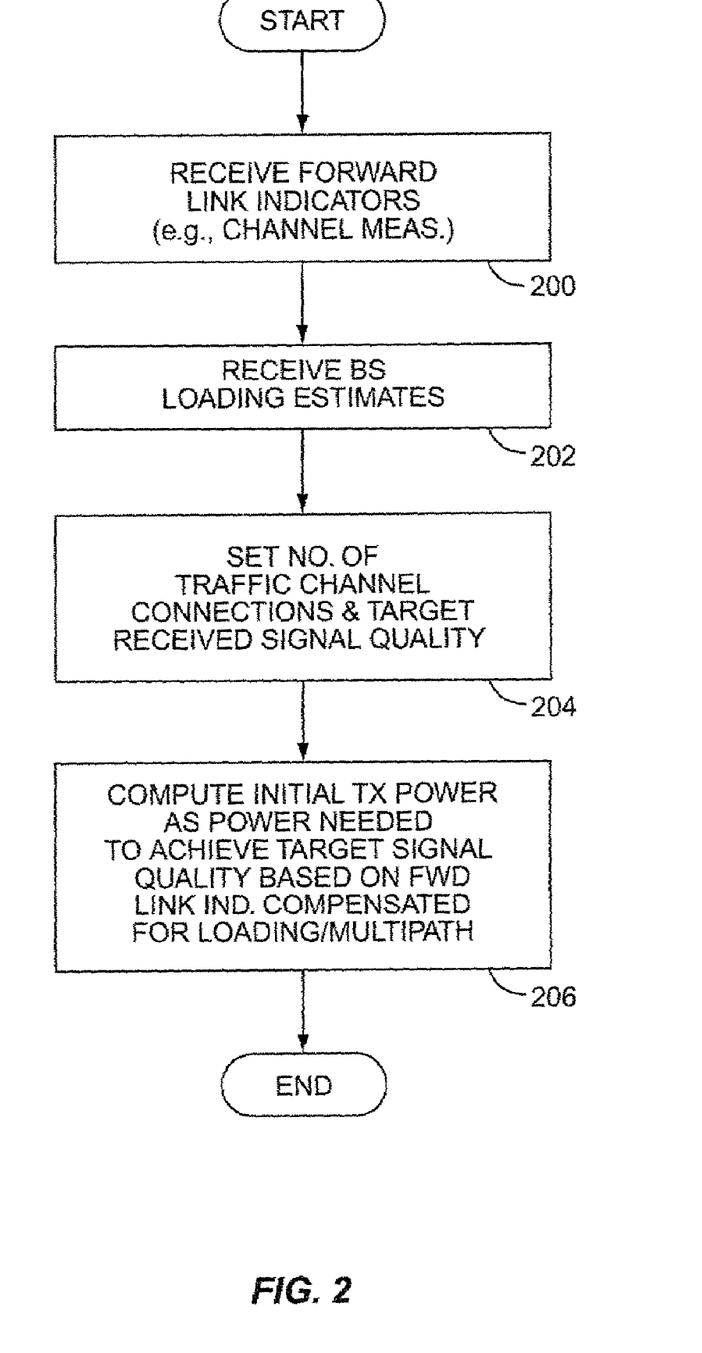
FIG. 2 is a logic flow diagram illustrating exemplary logic for practicing the present invention.

FIG. 2 depicts an exemplary, top-level approach to transmit power initialization at the network 100. Processing starts with the network 100 receiving forward link quality indicators from the MS 102 in advance of establishing the forward link traffic channel (Step 200). As noted, such forward link quality indicators may be pilot signal strength measurements transmitted from the MS 102 to the network 100 for candidate BSs 104.

Because pilot signal measurements may be skewed or otherwise biased somewhat by forward link loading conditions, the network 100 receives base station loading estimates from the candidate BSs 104 (Step 202), which it uses to remove forward link loading biases from the pilot signal measurements. In exemplary embodiments, the MS 102 transmits pilot signal measurements to one or more BSs 104, which in turn provides those measurements to the BSC 108. The BSC 108 further receives candidate base station loading estimates, and is thus positioned to make initial transmit power computations in accordance with the present invention.

First, the BSC 108 selects the number of traffic channel connections that will be used to support the contemplated forward link traffic channel (Step 204). That is, the BSC 108 determines which BSs 104 will be used to support the forward link traffic channel. As is explained in more detail later, the BSC 108 typically sets the number of traffic channel connections equal to the number of candidate BSs 104, i.e., to the number of BSs 104 in the active set of MS 102. However, circumstances might arise that force usage of fewer than all candidate BSs 104.

Regardless, the network 100 fixes or otherwise determines the number of traffic channel connections, and then computes the initial transmit power as the actual transmit power required to achieve a desired traffic channel received signal quality at the MS 102. A generalized form of the computation considers the expected forward link path loss and interference as inferred from compensated pilot signal measurements, which considerations provide a basis for determining the required initial transmit power.

More generally, the network 100 knows or can determine the target received signal quality desired for reception of the forward link traffic channel at the MS 102 based on the service option negotiated between the network 100 and the MS 102. In a typical CDMA system, a given service option may include one of several possible data rates, and in other instances such as voice service, may include only one possible data rate. Variable data rates are particularly common in packet data service options, such as those available in IS-2000 and WCDMA systems. Regardless, the general maxim is that the higher the data rate, the higher the required received signal quality at the MS 102. Of course, for a given selected data rate, the network 100 might adjust the required signal quality value based on diversity gains expected from the use of multiple traffic channel connections. Such adjustments embody the idea that with a greater number of transmission points comes greater resistance to channel fading, etc.

In more detail, a forward link between a given BS 104 and the MS 102 is considered. Meeting a desired received signal quality at the MS 102 requires that the MS 102 must receive the traffic channel signal at a high enough level. This requirement may be expressed in terms of signal-to-noise ratio (SNR), which itself can be expressed in terms of received bit-energy to noise power spectral density ratio. Thus, the ratio of traffic channel received bit energy to noise power spectral density, $$Traffic \frac{E_b}{N_t},$$

at the MS 102 must be set to a level such that:

$$\text{required transmit } Traffic E_b = \qquad (1)$$
$$Traffic \frac{E_b}{N_t}(Total\ Interference)(Path\ Loss)$$

That is, in (1) above, the transmit bit energy to achieve the required target received signal quality at the MS 102 equals the desired traffic channel bit-energy to noise power spectral density multiplied by the path loss and multiplied by the total received interference at the MS 102.

From the mobile's perspective, the total received interference equals other cell interference plus self-interference and path loss equals the base station transmit power spectral density divided by the received power spectral density from said base station. Thus, the required traffic channel transmit bit energy may be expressed as, required transmit TrafficE$_b$=desired received traffic channel bit-energy to noise power spectral density ratio×(other cell interference+self-interference)×(transmit power spectral density/received power spectral density). (2)

Equivalently, required transmit TrafficE$_b$=desired received traffic channel bit-energy to noise power spectral density ratio×(other cell interference/received power spectral density+self-interference/received power spectral density)×transmit power spectral density. (3)

Where the other cell interference to received power spectral density ratio can be inferred from:

measured base station load, expressed in terms of transmit pilot energy to total transmit power spectral density ratio; and received pilot energy to total received power spectral density ratio, as measured by the mobile station and reported to the base station via signaling messages.

That is, other cell interference to received power spectral density ratio≈transmit pilot energy to total transmit power spectral density ratio/received pilot energy to total power spectral density ratio. (4)

Where the self-interference to received power spectral density ratio can be inferred from a multipath profile, which, in at least some exemplary embodiments of the present invention, is known a priori by the network 100. The network 100 may store multipath propagation information, including default multipath profile information that defines the number of multipaths to be assumed for in-cell interference calculations, and the relative path strengths of the multipaths. In an exemplary embodiment, the network 100 uses a default number of same-strength multipaths in its in-cell interference calculations.

From the above expressions, one sees that the network 100 uses pilot signal measurements from the MS 102 reported for the BS 104 of interest, in conjunction with forward link load estimates from the BS 104 of interest, to determine self-interference and other-cell interference at the MS 102. Further, as shown, this determination by the network uses one or more multipath profiles, which typically comprise a set of multipath estimates for the forward link channel between the BS 104 of interest and the MS 102. Multipath estimates might, in an exemplary embodiment, comprise a set of default estimates regarding the number of propagation paths and the relative path delays and attenuations. Of course, the network 100 might use other-than-default values in some implementations.

In an exemplary embodiment where the network 100 contemplates the use of a single BS 104 for supporting the traffic channel to be established between it and the MS 102, the above operations may be expressed as, $$\frac{Traffic\, P_{TX}}{Pilot\, P_{TX}} = \frac{Traffic \frac{E_b}{N_t} \cdot \left(\frac{PilotE_c}{I_{or}} - Pilot\frac{E_c}{I_o}\right)}{\frac{R_c}{R_b} \cdot \frac{PilotE_c}{I_{or}} \cdot Pilot\frac{E_c}{I_o}}, \quad (5)$$

where $$\frac{Traffic\, P_{TX}}{Pilot\, P_{TX}}$$

is the ratio of traffic channel transmit power to pilot channel transmit power, Rc/Rb represents a processing gain dependent on the chipping rate over the bit rate, and where a single-path propagation channel is considered.

In an another exemplary embodiment where the network 100 contemplates the use of multiple BSs 104 for supporting the traffic channel to be established between it and the MS 102, it consolidates the above operations into a joint calculation that may be expressed as, $$\frac{Traffic\, P_{TX}}{Pilot\, P_{TX}} = \frac{Traffic \frac{E_b}{N_t}}{\frac{R_c}{R_b} \sum_{i=1}^{N} \left[ \frac{\left(\frac{PilotE_{c,i}}{I_{or,i}}\right) Pilot\frac{E_{c,i}}{I_o}}{\left(\frac{PilotE_{c,i}}{I_{or,i}}\right) - \frac{1}{L}\left(Pilot\frac{E_{c,i}}{I_o}\right)} \right]}. \quad (6)$$

Where the summation over N represents the use of N traffic channel connections or serving BSs 104 to initially be used for establishing the traffic channel, Rc/Rb represents a processing gain dependent on the chipping rate over the bit rate, and where L represents the number of multipaths considered, with each path assumed to have equal strength. Note that the above computation expresses the required initial transmit power on a per-connection (e.g., per BS 104) basis using a defined ratio between pilot channel power, Pilot $P_{Tx}$, and traffic channel power, Traffic $P_{Tx}$.

In another exemplary embodiment where the network 100 contemplates the use of multiple BSs 104 for supporting the traffic channel to be established between it and the MS 102, it consolidates the above operations into a joint calculation that may be expressed as $$\frac{Traffic\, P_{TX}}{Pilot\, P_{TX}} = \frac{Traffic\frac{E_b}{N_t}}{\frac{R_c}{R_b} \sum_{i=1}^{N} \frac{PilotE_{c,i}}{I_{or,i}} \sum_{l=1}^{L_i} \frac{a_{i,l} Pilot\frac{E_{c,i}}{I_o}}{\frac{PilotE_{c,i}}{I_{or,i}} - a_{i,l} Pilot\frac{E_{c,i}}{I_o}}} \quad (7)$$

Where the summation over N represents the use of N traffic channel connections or serving BSs 104 to initially be used for establishing the traffic channel, Rc/Rb represents a processing gain dependent on the chipping rate over the bit rate, and where $L_i$ represents the number of multipaths considered for the $i^{th}$ BS 104, each path assumed to have strength $a_{i,l}$. Note that the above computation expresses the required initial transmit power on a per-connection (e.g., per BS 104) basis using a defined ratio between pilot channel power, Pilot $P_{Tx}$, and traffic channel power, Traffic $P_{Tx}$.

Where one or more of the candidate BSs 104 lack sufficient reserve forward link power to support the above calculated transmit power, the network generally either reduces the targeted data rate and re-computes the per-connection power requirement, or drops the offending BSs 104 from consideration and re-computes with the reduced set of BS 104. Of course, other techniques might be employed, and the two primary approaches might be combined by network 100, such as where the network 100 drops the target data rate to a minimum value defined for the service in attempts to find a supportable initial transmit power, and then begins dropping BSs 104 from the candidate set in an attempt to eliminate BSs 104 with low reserve power.

Figure 3:
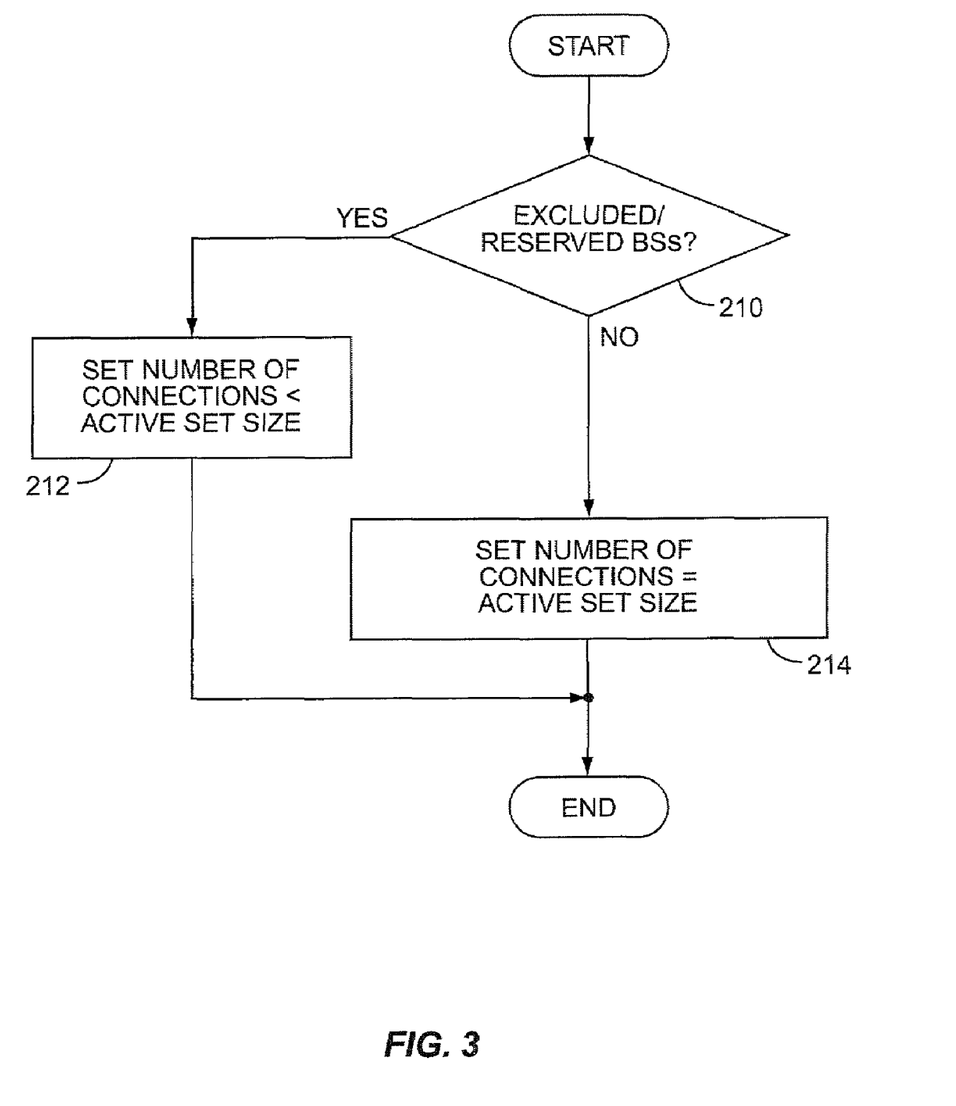
FIG. 3 is a logic flow diagram illustrating exemplary logic for setting the number of traffic channel connections to be used in establishing a forward link traffic channel.

FIG. 3 illustrates at least one component of the network's exemplary selection logic. Here, the network 100 determines whether any BSs within the MS's active set are reserved or otherwise excluded (Step 210). If so, the network 100 reduces the number N of traffic channel connections to be used in establishing the traffic channel based on the number of excluded or reserved BSs 104, and initial set reduction processing ends. Where all BSs 104 in the mobile's active set are available, the network 100 sets, in a first pass, the number of planned traffic channel connections equal to the active set size of the MS 102.

Those skilled in the art will appreciate that many variations are available for determining the number of traffic channel connections to be used. In general, the BSC 108 sets the number of planned connections for supporting the traffic channel equal to the number of candidate BSs 104 in the mobile's active set; thus, the "connection set" size generally equals the active set size. However, the BSC 108 might, as described above, reduce the connection set size where one or more of the candidate BSs 104 are reserved or should otherwise be excluded from use in supporting the traffic channel.

Figure 4:
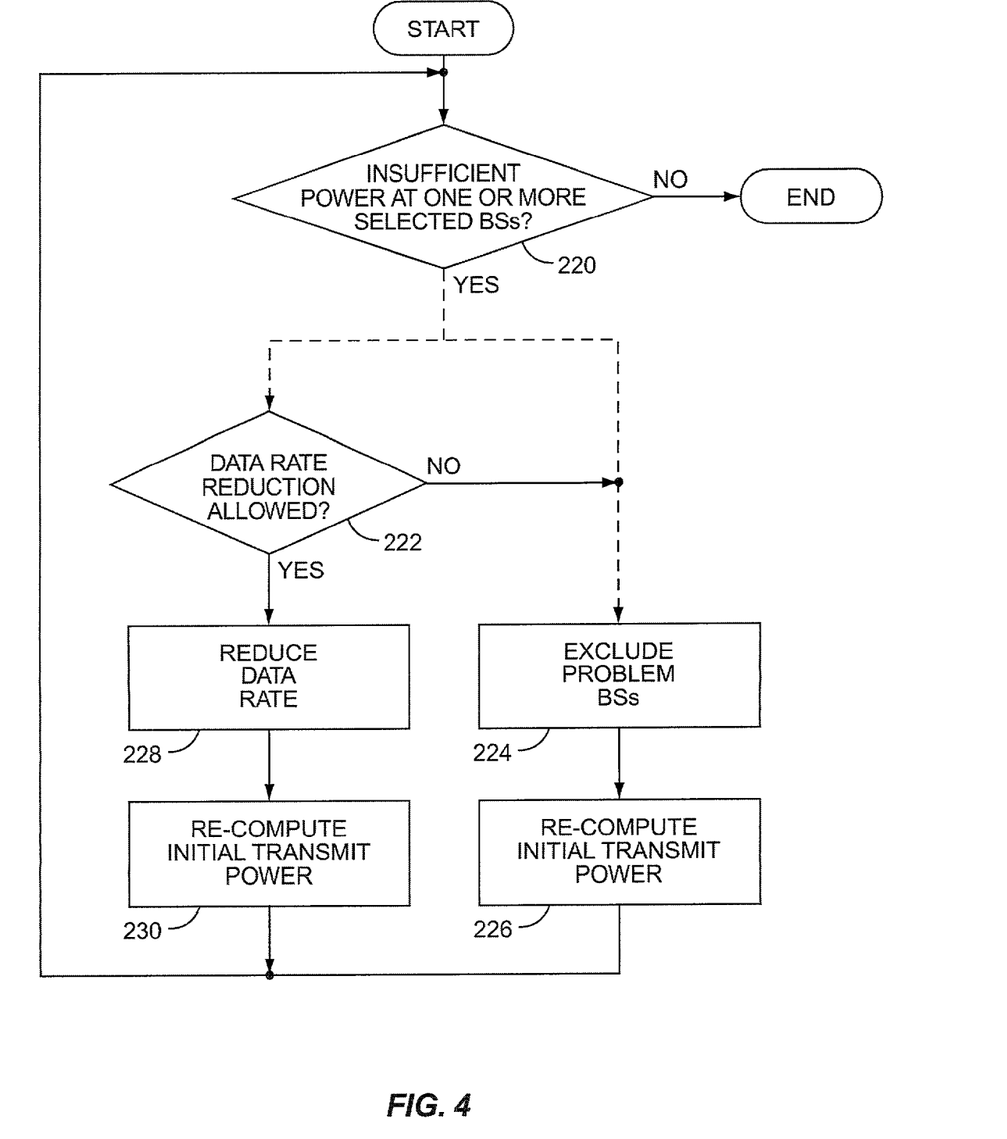
FIG. 4 is a logic flow diagram illustrating exemplary logic for setting initial transmit power based on dynamic conditions at the involved base stations.

While FIG. 3 illustrates initial selection logic that might be applied by the network 100 before computing required transmit power, FIG. 4 illustrates an exemplary approach for instances where the computed required transmit power exceeds the reserve power available from one or more of the BSs 104 in the connection set. That is, the following logic might be applied by the network 100 when the per-connection transmit power exceeds the reserve forward link power at one or more BSs 104 the network planned to use for establishing the traffic channel.

Thus, processing begins with the network 100 determining whether any of the selected BSs 104 lack sufficient reserve forward link power relative to the computed required transmit power (Step 220). If not, re-calculation of the required initial transmit power ends, and the network 100 retains the previously calculated initial transmit power and uses the currently selected BSs 104.

However, if one or more of the BSs 104 in the planned connection set lack sufficient reserve power, the network 100 optionally follows a data-rate reduction approach (Step 222), follows a connection-exclusion approach (Step 224), or follows some combination thereof. For example, the network 100 might determine whether a data rate reduction is permitted for the current service option (Step 228) and, if so, reduce the data rate and re-compute the required initial transmit power based on the reduced target received signal quality associated with the lowered data rate (Step 230). At that point, processing loops back to the reserve power check (Step 220), where the network determines whether the reduced power level falls within available limits. If power limits are met, processing ends. Otherwise, processing repeats with the network either further lowering the data rate and recomputing required transmit power iteratively, or by excluding planned traffic channel connections.

The latter choice reflects an exemplary approach and, indeed, the network 100 might adopt the exclusion approach with or without benefit of the data-reduction approach. In the exclusion approach, the network 100 determines which BSs 104 planned for use lack sufficient reserve power, and excludes them from consideration (Step 224). The network 100 then re-computes the required initial transmit power using the number of connections available from the reduced set of BSs 104. Again, processing returns for determination of whether the now-reduced set of BSs 104 has sufficient power to support the re-computed required initial transmit power (Step 220). As with the data-reduction approach, the network 100 can iterate through the connection-exclusion approach until it finds a satisfactory solution set.

It should be understood that the above exemplary logic might be implemented in the BSC 108, or might be implemented as a cooperative effort between BSC 108 and the involved BSs 104. One advantage of BSC-based computation is that the BSC 108 represents a natural point of consolidation for initial transmit power computations affecting the BSs 104 operating under its control. Other network architectures or standards may use different terminology or different network entities to handle radio resource management and it should be understood that the term BSC as used herein is broadly construed to cover a variety of entities that provide the inventive functionality.

In general, the present invention provides a basis for determining the initial traffic channel transmit power required to reliably establish a forward link traffic channel between the network 100 and a given MS 102. The invention infers reception conditions at the MS 102, and determines the transmit power required to achieve a target traffic channel received signal quality at the MS 102. Such inferences rely on the use of channel measurements made by the MS 102 for BSs 104 that are candidates for serving the MS 102 on the forward link. In an exemplary embodiment, the network 100 receives pilot signal measurements made by the MS 102 for each of the candidate BSs 104. With these measurements, and with loading estimates and multipath profile estimates, the network 100 determines in-cell and other-cell interference at the MS 102, which allows it to properly set initial transmit power for the traffic channel.

Those skilled in the art will appreciate that the present invention represents an approach to initial, open-loop transmit power control that essentially mimics the closed-loop power control used once the traffic channel has been established with the MS 102. That is, the present invention uses feedback of pilot channel measurements made by the MS 102 to determine reception conditions (e.g., path loss and interference) at the MS 102, and then sets the initial transmit power to be used in establishing a traffic channel to the MS 102 to the level needed to achieve a target received signal quality for the traffic channel at the MS 102. As such, the above details are exemplary and not limiting. Indeed, the present invention is limited only by the scope of the following claims, and the reasonable equivalents thereof.

What is claimed is:

1. A method of establishing an initial transmit power for a forward link traffic channel to be established between one or more candidate base stations in a wireless network and a mobile station, the method comprising:
   receiving pilot signal strength measurements from the mobile station for the candidate base stations;
   determining forward link quality based on the pilot signal strength measurements;
   setting a target received signal quality for the traffic channel based on a service option negotiated between the mobile station and the network; and
   calculating the initial transmit power for the traffic channel based on the forward link quality and the target received signal quality.

2. The method of claim 1, wherein determining forward link quality comprises determining interference at the mobile station using the pilot signal measurements from the mobile station compensated for base station loading biases.

3. The method of claim 2, further comprising receiving base station loading estimates from the candidate base stations for use in compensating the pilot signal measurements.

4. The method of claim 3, wherein calculating the initial transmit power for the traffic channel is further based on the base station loading estimates.

5. The method of claim 4, further comprising compensating the pilot signal strength measurements for loading bias using the base station loading estimates.

6. The method of claim 1, wherein calculating the initial transmit power of the traffic channel is further based on estimated multipath characteristics.

7. The method of claim 6, wherein the estimated multipath characteristics comprise stored path estimates for a defined number of multipaths.

8. The method of claim 7, wherein the same path estimate is used for each multipath.

9. The method of claim 1, further comprising setting a number of traffic channel connections to be established from the candidate base stations for supporting the traffic channel.

10. The method of claim 8, further comprising adjusting the target signal received signal quality based on the number of traffic channel connections.

11. The method of claim 9, further comprising calculating the initial transmit power of the traffic channel based on the number of traffic channel connections.

12. The method of claim 11, wherein calculating the initial transmit power of the traffic channel based on the number of traffic channel connections comprises calculating an initial transmit power to be used for each traffic channel connection.

13. The method of claim 1, further comprising adjusting the target received signal quality for diversity gains.

14. The method of claim 13, further comprising determining diversity gains based on a number of traffic channel connections to be established for the traffic channel from the one or more candidate base stations.

15. The method of claim 14, wherein adjusting the target received signal quality comprises reducing the target received signal quality such that the calculated initial transmit power is reduced with an increasing number of traffic channel connections.

16. A method of establishing an initial transmit power for a forward link traffic channel to be established between one or more candidate base stations in a wireless network and a mobile station, the method comprising:
receiving pilot signal measurements for the candidate base stations from the mobile station;
removing base station loading bias from the pilot signal measurements to generate compensated measurements;
setting a target received signal quality for the traffic channel based on a desired traffic channel data rate; and
calculating the initial transmit power based on the compensated measurements and the target received signal quality.

17. The method of claim 16, further comprising receiving base station loading estimates from the candidate base stations for use in compensating the pilot signal measurements.

18. The method of claim 16, further comprising setting a number of traffic channel connections to be established from the candidate base stations for supporting the traffic channel.

19. The method of claim 18, further comprising adjusting the target received signal quality based on the number of connections to be established.

20. The method of claim 19, wherein adjusting the target received signal quality comprises adjusting the target received signal quality in an inverse relation with the number of traffic channel connects to reflect diversity gains associated with increasing numbers of traffic channel connections.

21. The method of claim 18, wherein setting the number of traffic channel connections comprises setting the number of traffic channel connections equal to or less than the number of candidate base stations.

22. The method of claim 21, further comprising setting the number of traffic channel connections equal to the number of candidate base stations.

23. The method of claim 18, further comprising calculating the initial transmit power based on the number of traffic channel connections such that the initial transmit power calculated is a per connection transmit power.

24. The method of claim 23, further comprising:
reducing the desired data rate and thereby reducing the target received signal quality if any candidate base station to be used to provide one of the traffic channel connections lacks sufficient residual transmit power to support the calculated per connection transmit power; and
re-calculating the initial transmit power based on the reduced desired data rate.

25. The method of claim 23, further comprising:
setting a reduced number of traffic channel connections to be established by eliminating from consideration any candidate base station that lacks sufficient residual transmit power to support the calculated per connection transmit power; and
re-calculating the initial transmit power based on the reduced number of traffic channel connections to be established.

26. The method of claim 16, wherein calculating the initial transmit power based on the compensated measurements and the target received signal quality comprises calculating the initial transmit power as the power required to achieve the target received signal quality at the mobile based on forward link quality as inferred from the compensated measurements.

27. The method of claim 16, wherein calculating the initial transmit power based on the compensated measurements and the target received signal quality comprises calculating the initial transmit power based on a defined traffic-to-pilot channel power ratio and the compensated measurements.

28. A base station controller for use in a wireless communication network, the base station controller operative to:
receive pilot signal measurements made by a mobile station for one or more base stations that are candidates for serving the mobile station on a forward link traffic channel to be established;
receive forward link loading estimates from the one or more candidate base stations;
determine a forward link quality relative to the mobile station based on the pilot signal measurements and the forward link loading estimates;
determine a target received signal quality for the traffic channel based on a service option negotiated between the mobile station and the network; and
calculate an initial transmit power required from the one or more candidate base stations for establishing the forward link traffic channel based on the determined forward link quality and the target received signal quality.

29. The base station controller of claim 28, wherein the base station controller determines the forward link quality based on estimating in-cell and other-cell interference components of a total received interference at the mobile station.

30. The base station controller of claim 29, wherein the base station controller determines the in-cell interference component of the total received interference at the mobile station for a given candidate base station based on the forward link loading estimate received from the given candidate base station and a multipath profile for the given candidate base station.

31. The base station controller of claim 30, wherein the base station controller accesses stored multipath profile information to obtain the multipath profile for the given candidate base station.

32. The base station controller of claim 28, wherein if one or more of the candidate base stations lacks sufficient reserve power to support the calculated initial transmit power, the base station controller lowers initial transmit power requirements based on data-rate reduction wherein the base station controller:
reduces a target data rate for serving the mobile station;
determines a new target received signal quality for the reduced target data rate; and re-calculates the initial transmit power based on the new target received signal quality.

33. The base station controller of claim 32, wherein the base station controller iteratively performs data rate reduction until the calculated initial transmit power falls within reserve power limits at each candidate base station.

34. The base station controller of claim 33, wherein the base station controller iteratively performs data rate reduction until a lower data rate limit is reached, and then performs connection exclusion operations, wherein the base station controller excludes candidate base stations that lack sufficient reserve power and re-calculates the initial transmit power based on remaining ones of the candidate base stations.

35. The base station controller of claim 28, wherein the base station controller:

reduces a number of planned traffic channel connections for supporting the forward link traffic channel based on excluding any candidate base stations that lack sufficient reserve power to support the calculated initial transmit power; and re-calculates the initial transmit power based on the reduced number of planned traffic channel connections.

36. The base station controller of claim 35, wherein the base station controller iteratively reduces the number of planned connections and re-calculates the initial transmit power until each remaining candidate base station has sufficient reserve power.

37. The base station controller of claim 35, wherein the base station controller lowers transmit power requirements by decreasing a planned service data rate for the mobile station once iterative reduction of the number of planned connections reaches a lower connection number limit.

* * * * *

UNITED STATES PATENT AND TRADEMARK OFFICE
CERTIFICATE OF CORRECTION

PATENT NO. : 7,194,280 B2 Page 1 of 1
APPLICATION NO. : 10/145858
DATED : March 20, 2007
INVENTOR(S) : Vieri Vanghi It is certified that error appears in the above-identified patent and that said Letters Patent is hereby corrected as shown below:

In Column 4, Line 45, after "controls" insert -- a --.

In Column 4, Line 46, after "104-2" insert -- , --.

In Column 4, Line 46, after ". . ." insert -- . --.

In Column 6, Line 25, insert -- desired received -- before "Traffic".

In Column 12, Line 63, in Claim 32, after "reduction" insert -- , --.

Signed and Sealed this

First Day of April, 2008

JON W. DUDAS
*Director of the United States Patent and Trademark Office*